No. 806,801. PATENTED DEC. 12, 1905.
O. C. GREENE & C. H. GAUNT.
TELEGRAPH REPEATER.
APPLICATION FILED APR. 28, 1902.

Witnesses,
W. H. Palmer
Emily Eastman

Inventors,
Oscar C. Greene,
Charles H. Gaunt,
by Lothrop & Johnson
their Attorneys.

UNITED STATES PATENT OFFICE.

OSCAR C. GREENE, OF ST. PAUL, MINNESOTA, AND CHARLES H. GAUNT, OF TOPEKA, KANSAS.

TELEGRAPH-REPEATER.

No. 806,801.        Specification of Letters Patent.        Patented Dec. 12, 1905.

Application filed April 28, 1902. Serial No. 104,946.

*To all whom it may concern:*

Be it known that we, OSCAR C. GREENE, residing at St. Paul, in the county of Ramsey and State of Minnesota, and CHARLES H. GAUNT, residing at Topeka, in the county of Shawnee and State of Kansas, citizens of the United States, have invented certain new and useful Improvements in Telegraph-Repeaters, of which the following is a specification.

Our invention relates to improvements in telegraph-repeaters, its object being to simplify, improve, and increase the speed and efficiency of operation of the repeating apparatus, by means of which messages are automatically repeated or transferred from one telegraph-circuit to another. To this end we provide in each circuit, in connection with an ordinary relay, a repeating sounder having a magnet so wound, energized, and connected directly with the opposite repeating sounder that the lever of the repeating sounder on the outgoing side will not operate to open the circuit on the incoming side. The repeating sounder on the outgoing side thus comprises within itself the means of controlling directly the action of the repeating sounder on the incoming side and makes it possible to dispense with all auxiliary or additional magnets, levers, batteries, and apparatus designed to accomplish this purpose indirectly, as by acting upon the relay.

Figure 1:
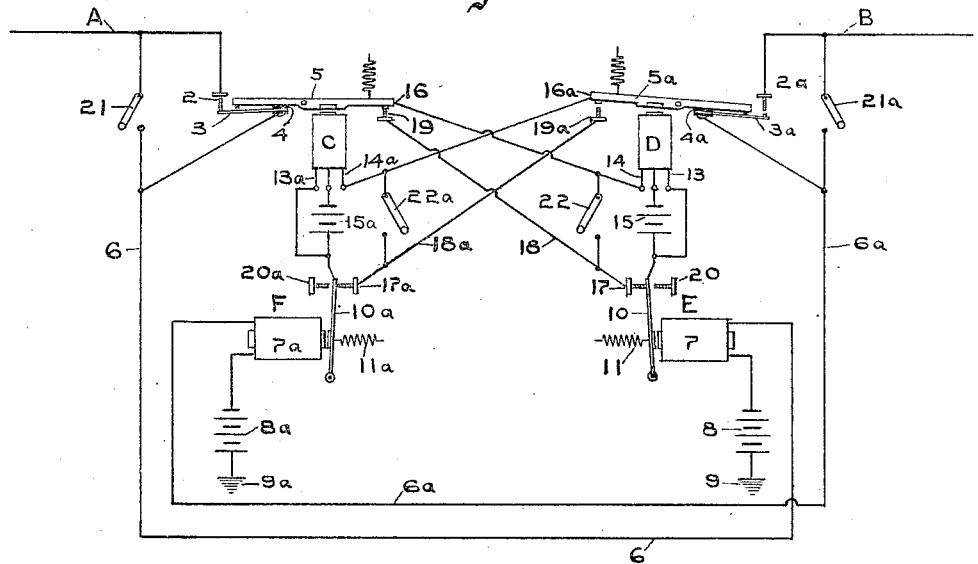
Figure 2:
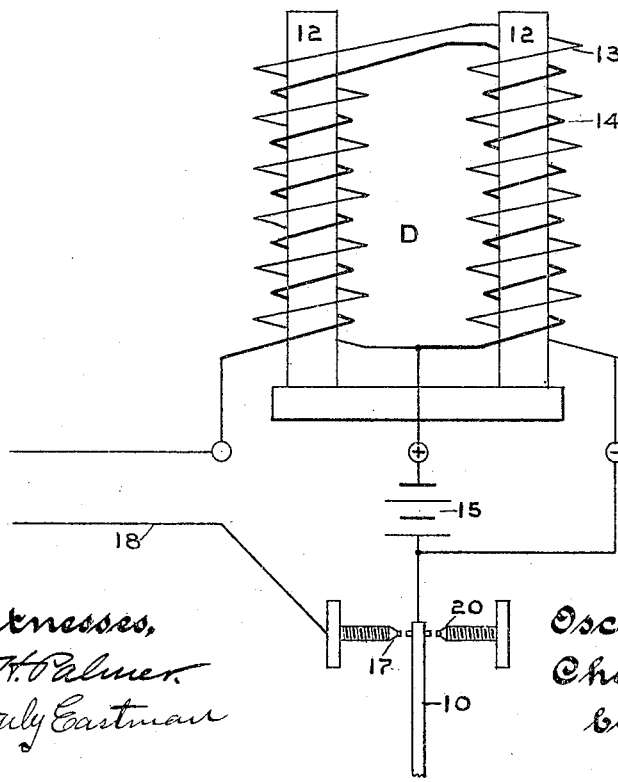

In the accompanying drawings, forming part of this specification, Figure 1 is a diagrammatic view of two telegraph-circuits and our improved repeating apparatus, and Fig. 2 is a similar view of the windings of the magnet of the repeater-sounder and their connections.

In the drawings, A and B represent the two circuit-lines, and C and D the adjacent repeating sounders. The end of line A is connected with a contact 2, disposed for engagement with the spring-contact 3, secured upon the back end of the lever 5 of the repeating sounder C by insulation 4. The spring-contact 3 is connected, through the line 6, with the coil 7 of an ordinary Morse relay E and then through the battery 8 with the ground 9. The line B is similarly connected, through contacts $2^a$ and $3^a$, line $6^a$, coil $7^a$ of relay F, and battery $8^a$, with the ground at $9^a$. The spring-contact $3^a$ is secured, by means of insulation $4^a$, to the lever $5^a$ of the repeating sounder D. The levers or armatures 10 and $10^a$ of the relays E and F, respectively, are held normally out of contact with the magnets of the relays by means of retractile springs 11 and $11^a$.

The repeating sounders are provided with differential windings, as best shown in Fig. 2, where—

12 represents the core, and 13 and 14, respectively, the double windings of the repeating sounder D. The winding 13 is connected at one end with the positive pole and at the other end with the negative pole of the battery 15. The coil or winding 13 is thus permanently energized to attact the armature or lever $5^a$ and hold the repeating sounder normally closed. The other coil or winding 14 is connected at one end with the front contact 16 of the opposite repeating sounder C and at the other end, through the battery 15, with the end of the lever 10 of the relay E, the circuit being completed through the back contact 17 of the relay and line 18 to the contact 19, disposed for coöperation with the contact 16 of the opposite repeating sounder C. 20 is a stop opposed to the contact 17. The windings of the opposite repeater-sounder C are similarly connected. Thus the winding $13^a$ is connected at one end with the positive pole and at the other end with the negative pole of the battery $15^a$, and the winding $14^a$ is connected at one end with the front contact $16^a$ of the repeating sounder D and at the other end, through the battery $15^a$, with the end of the lever $10^a$ of the relay F, the circuit being completed through the back contact $17^a$ of the relay and line $18^a$ and contacts $19^a$ and $16^a$ of the repeating sounder D. $20^a$ is a stop opposed to the contact $17^a$.

When both main lines are closed, both of the repeating sounders will be held closed, because of the presence of current in the permanently-energized windings 13 and $13^a$ and the absence of current in the differential windings 14 and $14^a$, the circuit of these last-mentioned windings being broken by the attracting of the relay-levers 10 and $10^a$ away from the contacts 17 and $17^a$. If now the line A be opened, the armature 10 of the relay E is released and carried back by its retractile spring 11 against its local back contact 17, thereby closing the circuit of the winding 14 through the battery 15 and causing a current to pass about the core 12 of the repeating sounder D on the outgoing side in an opposite direction to the current in the other winding 13, thus counteracting or neutralizing the magnetizing effect of winding 13 and permitting the armature or lever $5^a$ of the repeating sounder to be raised from its magnet by its retractile spring, thereby opening line B at the contact $2^a$ and also, just previous to this action of opening the line B, breaking the circuit of the winding $14^a$ at contact $19^a$. This prevents the closing of the circuit through $14^a$ when the lever $10^a$ is released by the magnet of its relay F upon the opening of line B and deprives the relay of its control of repeating sounder C on the incoming side. When line A is closed, the magnet of relay E will draw the lever 10 away from its local back contact 17, breaking the circuit of the winding 14 and removing the current therefrom, and thus allowing the current in the winding 13 to exert its magnetizing effect on the core to attract the armature $5^a$ and close the line B at contact $2^a$. It will be observed that the line B is closed at $2^a$ before the circuit of the winding $14^a$ is closed at the contact $19^a$, causing the magnet of the relay F to attract the lever $10^a$ away from its local back contact $17^a$ to open the local circuit of the winding $14^a$ before it is closed at $19^a$, and thus preventing false breaks. When it is desired to use the lines independently without repeating from one into the other, the switches 21, $21^a$, 22, and $22^a$ may be closed, thereby cutting out from each line its repeating sounder and short-circuiting the contacts 16 and 19 and $16^a$ and $19^a$.

The details of the devices herein shown and described may be modified in various ways without departing from the principle of the invention, the scope of which is defined in the claims.

Having now described our invention, what we claim as new, and desire to secure by Letters Patent, is—

1. The combination, with two main telegraph-lines and their relays, of a pair of repeating sounders, the magnet of each sounder having two differential windings, one winding forming a permanently-closed and energized local circuit, and the opposite winding forming a local circuit through one of the contact-points of the adjacent relay and one of the contact-points of the other repeating sounder, whereby the armature of the sounder upon the outgoing side will open or close the local circuit of the opposite sounder which passes through the contact-point of its relay.

2. A telegraph-repeater comprising two relays and two repeating sounders, each sounder having two differential windings, one of said windings forming a permanently-closed and energized local circuit and the other winding forming a circuit through the back contact-point of the adjacent relay and the front contact-point of the armature of the other repeating sounder, each sounder-armature having also a contact-point for the adjacent main line, said contact-points of the sounder being so arranged that the front contact-point breaks the opposite unenergized local circuit before the other contact-point breaks the adjacent main line, for the purpose described.

3. The combination, with two main telegraph-lines and their relays, of a pair of differentially-wound repeating sounders, one of the windings of each sounder forming a permanently-closed and energized local circuit and the opposite winding forming a circuit through the back contact-point of the adjacent relay and the front contact-point of the armature of the other repeating sounder, whereby the repeating sounder on the outgoing side will directly control the action of the repeating sounder on the incoming side, substantially as described.

In testimony whereof we affix our signatures in presence of two witnesses.

OSCAR C. GREENE.
CHARLES H. GAUNT.

Witnesses as to Oscar C. Greene:
H. S. JOHNSON,
EMILY EASTMAN.

Witnesses as to Charles H. Gaunt:
HENRIETTA STAUFFENBERG,
L. M. JONES.